INVENTOR.
ROBERT J. STAVA
ATTORNEYS

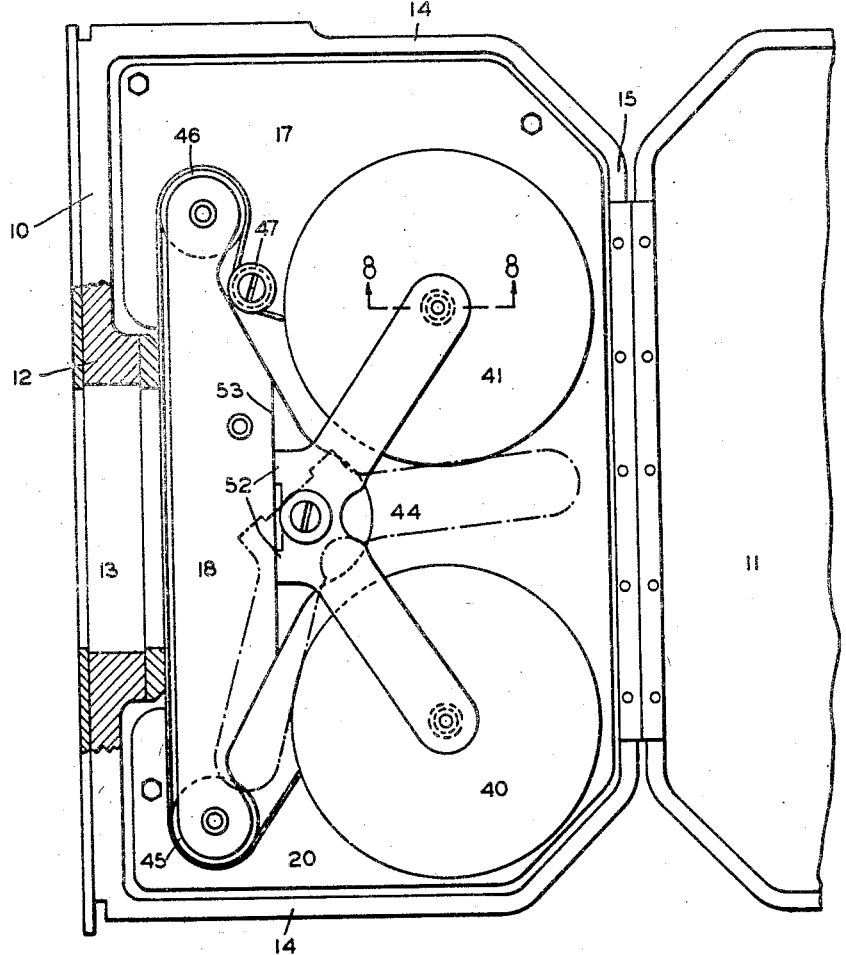

Feb. 22, 1949.  R. J. STAVA  2,462,687

FILM MAGAZINE

Filed Sept. 24, 1947  3 Sheets-Sheet 3

INVENTOR.
ROBERT J. STAVA
BY
ATTORNEYS

Patented Feb. 22, 1949

2,462,687

UNITED STATES PATENT OFFICE 2,462,687

FILM MAGAZINE

Robert J. Stava, University Heights, Ohio, assignor to Picker X-Ray Corporation Waite Manufacturing Division, Inc., Cleveland, Ohio, a corporation of Ohio Application September 24, 1947, Serial No. 775,862

5 Claims. (Cl. 88—17)

This invention relates to roll film magazines for use in X-ray photography.

One object of the invention is to provide an improved magazine which is of simple unit form capable of being readily attached to or removed from the camera, which includes simple and efficient means for advancing and holding roll film, and in which the supports for the film spools are arranged for convenient manipulation to both release the spools for replacement and to actuate the pressure plate for releasing the film.

A further object is to provide an improved film magazine including a shiftable member provided with supports for the spool ends, said member being swingable in a plane normal to the axes of rotation of the spools either to spool supporting or spool releasing position, for the purpose stated.

Still another object is to provide an improved film magazine embodying such a shiftable member in which operation of said member, to release the spools, also releases the pressure plate.

Further objects of the invention in part are obvious and in part will appear more in detail hereinafter.

In the drawings,

Fig. 1 represents a top plan view of a film magazine embodying the invention, with the cover in open position;

Fig. 2 is a perspective view thereof, on a reduced scale, with the cover closed;

Figure 3:
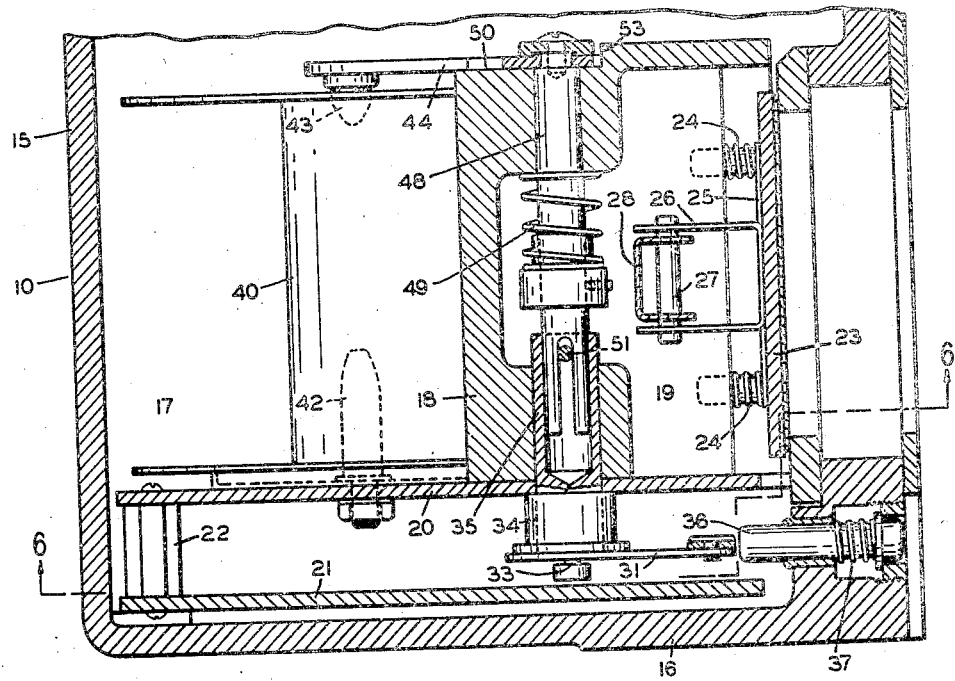
Fig. 3 is a sectional elevation on the line 3—3, Fig. 6.
Figure 4:
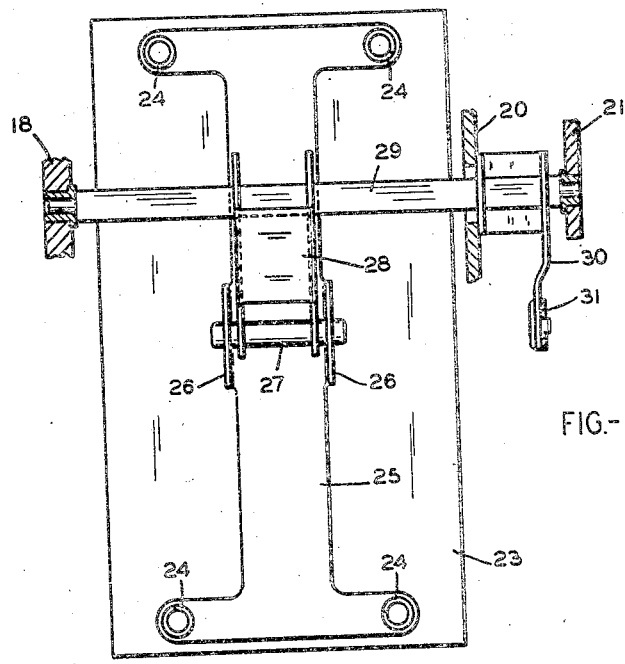
Fig. 4 is a detail sectional elevation on the line 4—4, Fig. 7.
Figure 5:
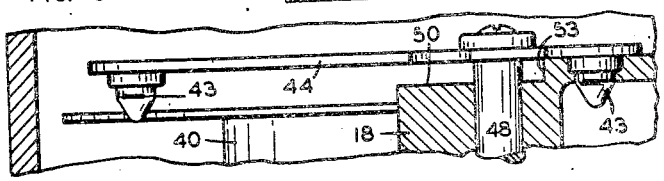
Fig. 5 is a detail view, corresponding to Fig. 3, but showing another position of the parts.

The film magazine shown in the drawings comprises a hollow body or casing 10 having a hinged cover 11, a front wall 12 provided with a window opening 13 through which the light rays reach the film, end walls 14, a rear wall 15, and a bottom 16, all surrounding or enclosing a chamber 17. Within said chamber is removably but rigidly mounted the film operating assembly. This includes a body member 18 lying in front of and extending across the window opening and presenting toward said opening a recess 19. Member 18 rests upon and is attached to a shelf 20 secured to and spaced from a floor member 21 by spacers 22, the floor member being removably attached to the casing bottom.

In recess 19 is located a film pressure plate 23 extending across the window opening and pressed toward it by springs 24. Said pressure plate is provided with a metal backing plate 25 through ears 26 of which passes a pin 27, pivotally connecting the pressure plate to a lever 28 attached to a shaft 29. This shaft is provided with a second arm 30 pivoted to the free end of a link 31 having a longitudinal slot 32 through which extends a pin 33 eccentrically mounted on the end of a shaft member 34 having a tubular portion 35 rotatably mounted in body member 18 (Fig. 3). The slot 32 and pin 33 guide link 31 when its motion is produced by pressure applied to its pivoted end, while the engagement of the pin with the end of the slot enables the pin to serve as a second actuator for the link, as will later appear. The pivoted end of link 31 (at the right in Figs. 3 and 7) lies opposite the inner end of a push rod 36 biased outwardly by spring 37, and the other end of which rod is exposed on the face of the front wall of the magazine where it is accessible for actuation by a push (not shown) mounted in the camera and actuated by mechanism therein, as more fully shown and described in my application for Camera, executed and filed of even date herewith, Serial Number 775,863, to which reference may be had.

Figure 8:
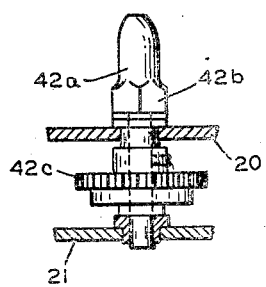
Fig. 8 is a detail section on the line 8—8, Fig. 1.

The roll film for the magazine is mounted upon a supply spool 40, upon which it is originally wound, from which it is led to a take-up spool 41, as is usual. Supply spool 40, when in operation is rotatably supported by a stub spindle 42 mounted upon shelf 20 and a nose or projection 43 carried by one arm of a two-armed plate 44. Take-up spool 41 is similarly supported, but here the stub spindle 42a is usually provided with a squared spool driving part 42b and is equipped with a pinion 42c (Fig. 8) by which it is turned to wind up the film as the latter advances.

The film is led from the supply spool around an idler roller 45, then across the exposure window between the pressure plate and casing front wall, then around a metering roll 46 (usually power driven) and thence around a small idle roll 47 to the take-up spool.

The two-armed plate 44 on which the projections 43 which support the upper ends of the spools are carried is fixedly attached to the outer or exposed end of a spindle 48 which is normally held down, in the operating position shown in Fig. 3, by a compression spring 49. In this position said plate rests upon a low step 50 at the top of body 18, and the projections 43 are yieldingly held in engagement with their respective recesses in the spool ends. Thus the spools are locked in place by the overlying arms of plate 44, from beneath which they cannot escape.

Spindle 48 is slotted to receive a cross pin 51 by which it is attached to and drives the tubular portion 35 of shaft 34.

Assuming the cover 11 to be closed, with spools and a film in place, and the operating parts in the positions shown, it is apparent that rotation of the metering roll by its operating mechanism will advance the film, while depression of the push rod 38 retracts the pressure plate to permit film advance, as will be readily understood.

Now, assuming that all of the film has been exposed and thus transferred to the take-up roll, or that film removal is necessary before it is all exposed, the magazine is removed from the camera and door 11 is opened. This exposes to view the upper ends of the two spools and the overhanging arms of plate 44 as shown in full lines Fig. 1. Plate 44 and shaft 48 cannot be turned while said plate lies upon the low step of body 18, due to interlocking engagement of its two feet 52 with a shoulder 53 of body 18. Hence the operator grasps said plate 44, lifts it up until feet 52 are freed from said shoulder and then turns it, clockwise in Fig. 1, to the dot-dash position shown. This operation both disengages the projections 43 from the spool ends and moves the arms of plate 44 out of the way, freely exposing the spool ends.

Figure 6:
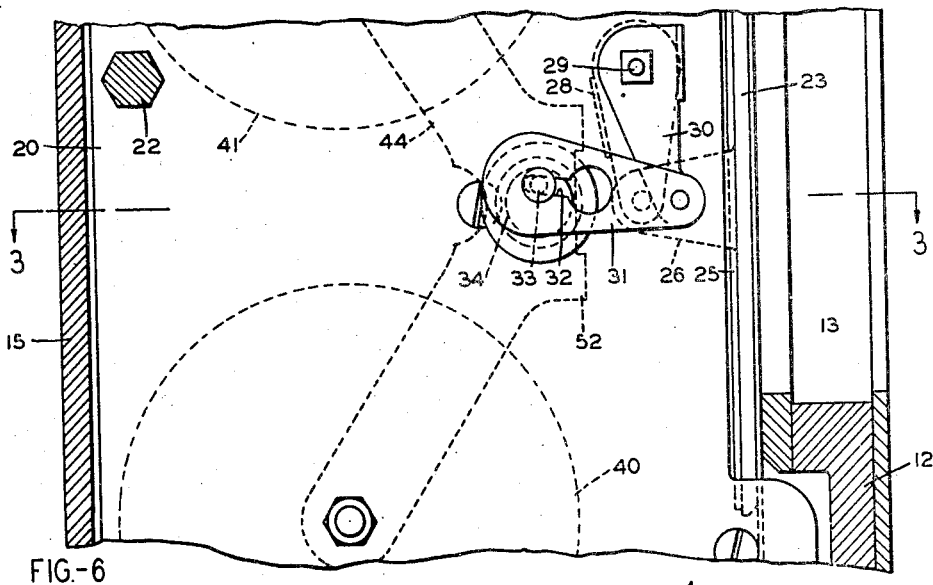
Fig. 6 is a bottom plan view on the line 6—6, Fig. 3.
Figure 7:
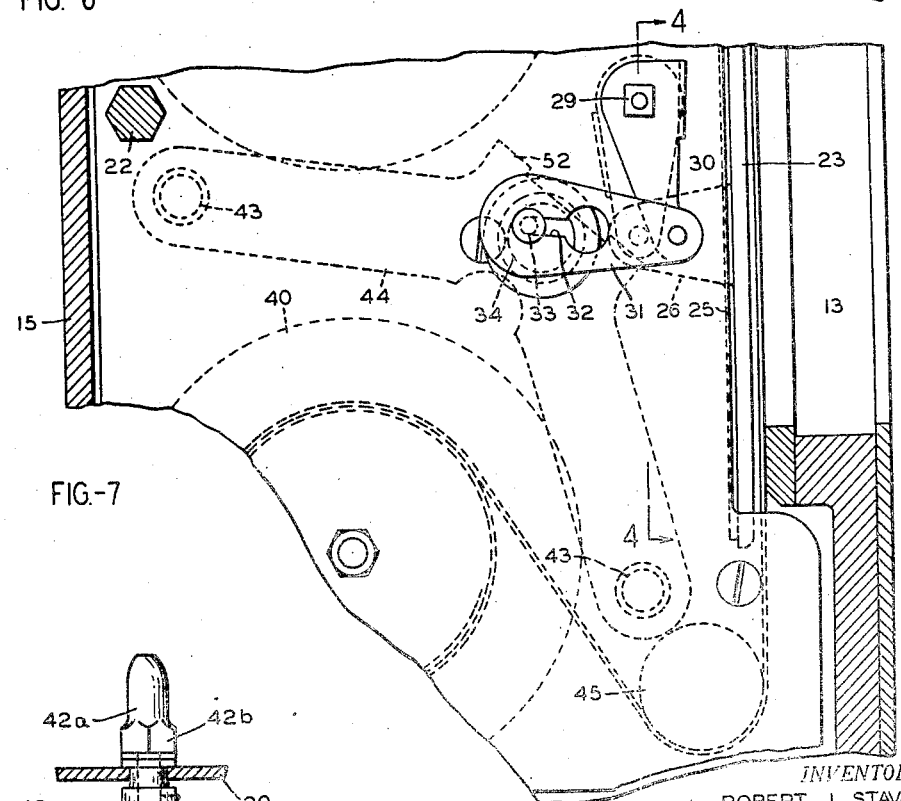
Fig. 7 is a similar view showing another position of the parts.

At the same time rotation of spindle 48 has turned shaft 34, the eccentric pin 33 on which moves from the position shown in Fig. 6 to that shown in Fig. 7, thus actuating link 31 and retracting or releasing the pressure plate from the film. Release of plate 44 leaves it temporarily in its second position, enabling the operator to grasp both film spools and remove them endwise from engagement with the stub spindles on which they are mounted.

A fresh spool of film now may be inserted and led through the film channel described to the take-up spool. Thereupon plate 44 is returned to its former position, again locking the spools and film in place and applying the pressure plate. With the cover closed the magazine is attached to the camera for use as before.

The construction described is simple, is not likely to get out of order, and operates satisfactorily over long periods of use. It positively locks the film in place during exposure conditions and entirely frees the film and spools for inspection, replacement or other manipulation.

Other advantages of the invention will be apparent to those skilled in the art.

What I claim is:

1. A roll film magazine for use in the production of X-ray negatives, comprising a chambered casing having one wall provided with a window opening through which focused light rays may be projected, two film spool spindles mounted in parallel relation in said casing and with which one end of each spool may be assembled, means for guiding the film from one spool across the window opening to the other spool, a plate member mounted to turn about and to move bodily along an axis parallel to but spaced from the spool spindles and provided with two arms, one for engaging the opposite end of each spool, said plate member normally providing bearings for said spools and locking them in place but being adjustable by motion around and along said axis to release the spools and film for removal and replacement, yielding means for biasing said plate member toward engaging relation of its arms with the spools, and means preventing rotation of said plate member about said axis when it is engaged with the spools.

2. A roll film magazine for use in the production of X-ray negatives, comprising a chambered casing having one wall provided with a window opening through which focused light rays may be projected, a pressure plate extending across said opening, means for yieldingly urging said plate toward said wall, two film spool spindles mounted in parallel relation in said casing and with which one end of each spool may be assembled, means for guiding the film from one spool across the window opening to the other spool, a plate member mounted to turn about and to move bodily along an axis parallel to but spaced from the spool spindles and provided with two arms, one for engaging the opposite end of each spool, said plate member normally providing bearings for said spools and locking them in place but being adjustable by motion around and along said axis to release the spools and film for removal and replacement, yielding means for biasing said plate member toward engaging relation of its arms with the spools, means preventing rotation of said plate member about said axis when it is engaged with the spools, and means operated by adjustment of said plate member for retracting said pressure plate to release the film.

3. In a roll film magazine comprising a chambered casing having two film spool spindles mounted therein with their axes parallel, one end of each spindle having a mounting connected with said casing, the combination of a securing member mounted to turn about and to move bodily along an axis parallel to but spaced from said spool spindles and provided with two arms, one arm for engaging the opposite end of each spindle, said securing member normally providing bearings for said spools and locking them in place but being adjustable by motion around and along its axis to release the spools and film for removal and replacement, means for so holding said securing member against accidental movement longitudinally of its own axis when in spool locking position, and stop means preventing rotation of said securing member about its axis when it is in spool locking position.

4. The combination of claim 3 wherein said chambered casing has an aperture for admitting image producing rays to the film, a pressure plate is provided for holding said film adjacent said aperture, and an operative connection between said securing member in spool releasing position and said pressure plate for holding said plate away from said film.

5. In a roll film magazine for attachment to a camera, comprising a chambered casing having two film spool spindles mounted therein with their axes parallel, one end of each spindle having a mounted connection with said casing, there being an aperture in said casing for admitting image producing rays to the film, a pressure plate for holding said film adjacent said aperture, means for guiding the film from one of said spools and between said aperture and plate to the other spool, a securing member provided with two arms, one arm for engaging the opposite end of each spindle, said securing member having a pivotal mounting providing for oscillation of said securing member between a spool locating position wherein said arms hold said spools and spindles in place and a spool unlocking position wherein said arms release said spools and film for removal and replacement, means for retracting said pressure plate to relieve its pressure against the film, and two actuators operatively connected with said retracting means, one of said actuators being camera responsive and the other of said actuators being responsive to the positioning of said securing member in spool releasing position.

ROBERT J. STAVA.

REFERENCES CITED

The following references are of record in the file of this patent:

UNITED STATES PATENTS

| Number | Name | Date |
|---|---|---|
| 694,926 | Houston | Mar. 4, 1902 |
| 1,935,210 | Hopkins | Nov. 14, 1933 |

FOREIGN PATENTS

| Number | Country | Date |
|---|---|---|
| 505,654 | Germany | Aug. 22, 1930 |